3,014,004
AQUEOUS COATING COMPOSITION COMPRISED OF POLYVINYLCHLORIDE AND VINYLIDENE CHLORIDE COPOLYMER, PROCESS FOR COATING, AND COATED PRODUCT
John Warren Meier, Madison, Tenn., assignor to E. I. du Pont de Nemours and Company, Wilmington, Del., a corporation of Delaware
No Drawing. Filed Feb. 15, 1957, Ser. No. 640,315
11 Claims. (Cl. 260—29.6)

This invention relates to coating processes and, more particularly, to improvements in coating non-fibrous base materials with aqueous dispersions comprising vinylidene chloride polymers or other synthetic polymers, whereby to form on the base materials continuous protective coatings comprising the polymers, which coated materials have excellent anti-blocking and improved slip properties.

Gilbert Pitzl, in U.S. Patents Numbers 2,541,167 and 2,570,478, discloses the coating of regenerated cellulose film with an aqueous dispersion of fine particles of amorphous vinylidene chloride polymer. The resulting coatings, after drying, are tough, flexible, strong, odorless, transparent, heat-sealable, and inherently moisture-resistant and, hence, constitute potentially valuable protective coatings for the base film. However, coatings of normally crystalline polymers such as vinylidene chloride polymers, i.e., coatings applied from an aqueous dispersion of amorphous polymer particles having a particle size ranging from 0.05 to 0.5 of a micron, whether on regenerated cellulose film or on any other non-fibrous, smooth base sheet of organic material, e.g., polyethylene terephthalate, cellulose acetate, etc., have two serious advantages, viz.: (1) the coated sheets or film tend to have strong blocking or matting characteristics, i.e., when superimposed sheets or film are pressed together (as in stacking for storage), the contacting surfaces strongly adhere to one another; and (2) sheets or film coated with such polymers have poor slip. "Slip" may be defined as a measure of the ease with which two contacting surfaces of a film slide past each other when held together under constant pressure while being subjected to a shearing action, or a measure of the ease with which a film slides past some other surface. These disadvantages are of particular concern when the coated film is to be used in automatic packaging and wrapping machines.

It is common practice to overcome matting and slip deficiencies by dusting film surfaces with particles of a dry material, such as talcum powder, or by treating with a liquid which will deposit solid particles on the film, cf.:

U.S. 2,008,815 (Brandenberger et al.)
U.S. 2,095,129 (Drew)
U.S. 2,167,105 (Drew)
U.S. 2,206,046 (Pollard)
U.S. 2,251,752 (Mitchell)

In either case, the treated film is covered with minute particles of solid materials which, in effect, roughen the surface and prevent intimate contact between film surfaces or between the film and some other surface, such as occurs in bag-making, packaging and wrapping machines. It is also possible to reduce matting and improve slip, in some cases, by the incorporation of particles of solid materials in the coating compositions. While these prior art expedients have proven generally satisfactory in the treatment of uncoated film and film coated with wax-containing moistureproofing compositions heretofore employed, difficulties have been encountered in all instances where such known treatments have been used on vinylidene chloride polymer and like polymer coatings. Dusting vinylidene chloride polymer-coated film with powdered materials, for example, is likely to cause objectionable surface haze and the loosely-attached particles may be rubbed off, leaving the film more or less in its original condition. When dusted film is printed on continuous printing machines, the dust particles also tend to adhere to the transfer and printing rolls from which they may become dislodged in flake form, causing unprinted spots in the film. The incorporation of the particulate material in the coating composition, in sufficient amount to impart optimum slip and reduced matting, is likely to result in hazy coatings. Moreover, when such coatings are applied by press-roll techniques, the moisture permeability of the coated film is generally seriously impaired. Liquid sizing treatments frequently leave objectionable hazy streaks and patterns on the film.

An object of this invention, therefore, is to provide polymer dispersion-coated films, of the character above described, having satisfactory slip characteristics and substantially no tendency to blocking. Another object is to inhibit blocking and enhance the slip characteristics of the hereinabove described polymer dispersion-coated film without adversely affecting other and desirable properties of the film such as clarity, heat-seal bond strength, moisture permeability, etc., irrespective of the coating method employed. Still another object is to provide a novel aqueous coating composition which when applied to films will provide a protective coating having satisfactory slip and anti-blocking characteristics. These and other objects will more clearly appear hereinafter.

The foregoing objects are realized by the present invention, which, briefly stated, comprises adding a sufficient amount of solid particles of polyvinyl chloride ranging in size from 0.10 to 1.5 microns to an aqueous dispersion of solid particles, ranging in size from 0.05 to 0.5 of a micron, of a copolymer of vinylidene chloride and at least one ethylenically unsaturated monomer polymerizable with vinylidene chloride, said copolymer containing not less than 75% vinylidene chloride, to form an aqueous dispersion coating composition containing from 0.1% to 5% by weight of polyvinyl chloride particles, based on the total weight of polymer particles in said dispersion, and thereafter applying said coating composition to a non-fibrous organic base sheet, and drying the coated base sheet.

As representative examples from the class of copolymers of vinylidene chloride and at least one ethylenically unsaturated monomer polymerizable with vinylidene chloride useful for coating non-fibrous organic base sheets, there may be mentioned: copolymers of vinylidene chloride/acrylonitrile, vinylidene chloride/methacrylonitrile, vinylidene chloride/methyl acrylate, vinylidene chloride/ethyl acrylate, vinylidene chloride/butyl acrylate vinylidene chloride/isobutyl acrylate, vinylidene chloride/methyl methacrylate, vinylidene chloride/ethyl methacrylate, vinylidene chloride/butyl methacrylate, vinylidene chloride/isobutyl methacrylate, vinylidene chloride/methyl vinyl ketone, vinylidene chloride/vinyl chloride, vinylidene chloride/vinyl acetate, vinylidene chloride/styrene, vinylidene chloride-dichlorovinylidene fluoride, vinylidene chloride/chloroprene, vinylidene chloride/buatadiene, and vinylidene chloride/methoxymethoxyethyl methacrylate. Itaconic acid may be copolymerized with each of the above to give 3 component systems. Also useful are copolymers of vinylidene chloride/dimethyl itaconate, vinylidene chloride/diethyl itaconate, vinylidene chloride/dibutyl itaconate, vinylidene chloride/vinyl pyridene, and vinylidene chloride/isoprene. Generally, the copolymer should contain not less than 75% of vinylidene chloride.

Any non-fibrous organic sheet or film susceptible to being coated with an aqueous dispersion of a vinylidene chloride copolymer may be used for purposes of this invention. Because of its commercial importance, regenerated cellulose film constitutes a preferred base film. Other suitable base materials are films of polyethylene; polyethylene terephthalate; polyvinyl alcohol; lowly esterified or etherified cellulose; casein; various polyamides such as polyhexamethylene adipamide, polyhexamethylene sebacamide, polycaproamide, and other types described in U.S. Patents Numbers 2,071,250 and 2,071,253; various cellulose esters such as cellulose acetate, cellulose nitrate, and cellulose acetate-butyrate; polyvinyl acetals; and vinyl compounds such as polyvinyl chloride/polyvinyl acetate copolymer, etc.

The coating, in accordance with this invention, is a continuous coalesced adherent layer of vinylidene chloride copolymer resulting from the coalescence of relatively fine particles of amorphous polymer, i.e., particles ranging in size from 0.05 to 0.5 of a micron, said layer having particles of polyvinyl chloride dispersed throughout as well as at the surface. It is not known if these vinyl chloride polymer particles remain in their original size of from 0.10 to 1.5 microns, or if they agglomerate to form larger particles.

The vinyl chloride polymer particles should be added to the dispersion in amounts of from 0.1% to 5% (based on the weight of polymer in the dispersion). The preferred range is from .25% to 3%.

While the concentration of solids in the aqueous dispersion coating compositions prepared as hereinabove described may be varied within wide limits, ready coalescence of the polymer particles into a continuous coating, and ease and economy in the drying step results from the use of coating dispersions having a relatively high concentration of solids, and for this reason it is preferred to employ aqueous dispersion coating composition containing from 30 to 55% by weight of total solids. Application of the coating dispersion to the base film should be son controlled as to deposit on the surface of the base film not more than 7.5 grams of coating solids per square meter per side of base film to avoid objectionable haziness in the coated film. In general, if less than 1 gram of coating per square meter per side of base film are deposited on the base film, the advantages of this invention will not be fully realized.

The following examples specifically illustrate the principles and practice of this invention. Parts and percentages are by weight, unless otherwise indicated.

EXAMPLE 1

An aqueous dispersion of a copolymer of vinylidene chloride, methyl acrylate and itaconic acid was prepared according to the following formula:

| | Parts |
|---|---|
| Vinylidene chloride | 376 |
| Methyl acrylate | 24 |
| Itaconic acid | 8 |
| Water | 400 |
| Ammonium persulfate | 0.8 |
| Meta sodium bisulfite | 0.4 |
| Duponol ME [1] | 8 |

[1] Sodium salts of sulfated straight-chain alcohols ranging from $C_{10}$ to $C_{18}$.

The dispersion was prepared by placing all the solids, including itaconic acid, in a round-bottom vessel, then water, and finally, the premixed monomers. The mixture was refluxed with agitation for two hours at 33°–34° C. Four parts of Duponol ME in a small amount of water were added after reflux ceased. The copolymer particles in the dispersion so produced ranged in size from 0.05 to 0.5 of a micron. To a portion of the dispersion so prepared was added 1.0% (based on the weight of polymer in the dispersion) of polyvinyl chloride particles ranging in size from 0.2 to 1.0 micron.

Regenerated cellulose film approximately 0.001″ thick was uniformly coated on both sides with the dispersion containing the added polymer particles, and dried to give a coated film containing 5–6 grams of total coating per square meter of base film. The dried, coated film was then evaluated for slip, matting, initial permeability value (I.P.V.) and heat-seal bond strength, as explained below, with the results shown in Table I. A control, for purposes of comparison, was prepared by similarly coating regenerated cellulose base film 0.001″ thick with the portion of dispersion not containing the polymer particles, and drying. Slip and matting, as shown in Table I, were both poor.

*Slip*

The slip value is measured by the cotangent of the angle of inclination at which a solid steel cube of 1¼″ side just begins to slide when both plane and cube are covered with the film under test. The test is carried out at room temperature of 20° to 25° C.

*Hand slip*

Hand slip was determined, in each instance, by folding the sheet and applying maximum, uniform squeezing pressure on the folded sheet between the thumb and forefinger and immediately, without releasing the pressure, following this with a shearing movement of the thumb and forefinger.

The three gradings for hand slip are defined as follows:
(1) The surface slides smoothly over itself. Slip is excellent.
(2) The surfaces slide jerkily over themselves, i.e., slip interruptedly, tend to jump or catch (usually at the beginning of the shearing movement). Slip is fair.
(3) The surface does not slide over itself and the thumb and forefinger tend to slip first. Slip is poor.

*Matting*

A. PREPARATION OF SAMPLES

A stack consisting of 30–32 3½″ x 4″ sheets of film, piled back to front throughout the stack, is placed on a 3½″ x 4″ sheet of chipboard and covered with a similar square of chipboard. The assembly is placed on a smooth sheet of metal at least ⅟₁₆″ thick and approximately 6″ square. A lead weight with a smooth face (3½″ x 4″) weighing a total of 4.6 pounds (⅓ lb./sq. in.) is accurately placed on top of the stack and the entire assembly is placed in an oven maintained at 45° C. with care exercised to prevent disturbing the uniform alignment of the sheets. For convenience in handling, the weight should have an inverted U handle which can be made from ¼″ metal rod. Several stacks of sheets, prepared as described above, can be piled together under one weight. The weighted sheets are held in the 45° C. oven for 24 hours, though no appreciable differences in matting result from retaining them in the oven for considerably longer periods such as three or more days. The stacks are then carefully removed from the oven and allowed to cool to room temperature (30 minutes or more) after which they are graded.

B. GRADING

After removal of the chipboard, the stack of film sheets is grasped by thumb and forefinger in the center of the stack. A shearing force is then applied with care taken to avoid bending the stack or disturbing its edges. Results are graded as follows:

Grade 1.—The sheets slide apart individually with no tendency whatever to cling together.

Grade 1+.—The sheets slide apart individually but with perceptible cling.

Grade 2.—The stack separates into two or more groups of sheets which remain moderately firmly matted together.

Grade 2+.—The stack separates on application of the maximum force into two or more groups of sheets which are firmly matted together.

Grade 3.—The stack cannot be separated by straight force.

Note.—Easy separation of the top and bottom sheets in 2, 2½ and 3 gradings should be disregarded.

I.P.V.

Initial permeability value is a measure of the moistureproofness of the coated film. The definition of and test for determining moistureproofness (I.P.V.) are set forth in U.S. Patent Number 2,147,180 (Ubben).

Hazemeter

The "Hazemeter" value, a measure of film haze or blush, is expressed in arbitrary units. It is determined on a meter which measures the extent to which a parallel beam of light is diffused upon passing through a single thickness of the film. The diffusion is picked up by a photoelectric tube and converted to electrical potential which is recorded as the "Hazemeter" value. The instrument is calibrated against glass standard haze specimens. As used here, "Hazemeter" values below 55 are satisfactory for transparent cellulose packaging films. Higher values denote increasingly unsatisfactory haze levels.

Heat-seal bond strength

Heat-seal bond strength is a measure of the strength of the bond between two films when they are sealed together by heat and pressure. For the purpose of comparison and definition, the following test is used to measure the strength of the heat-seal bond: A piece of the coated film 4" x 10" with the grain running in the long direction, is cut into two pieces 4" x 5", handling all pieces by the corners so as not to contact the areas to be sealed. The two pieces 4" x 5" are superimposed one on the other so that opposite surfaces are in contact. The two pieces of superimposed film are then sealed together at each end, at right angles to the grain, with a sealing bar ¾" wide, heated to 150° C. at 20 p.s.i. pressure and 2 seconds contact time. The sealed sheets are then cut in half at right angles to the grain, and each half is cut into 1½" wide strips, parallel to the grain, from the center of the sheets, resulting in four sets to be tested. Each set of the 1½" wide sealed strips is opened at the free ends, placed in a Suter tensile strength tester, and pulled apart. The force in grams required to pull the strips apart is taken as a measure of the heat-seal bond strength.

EXAMPLE 2

An aqueous dispersion of a copolymer of vinylidene chloride, methyl acrylate and itaconic acid was prepared according to the formula in Example 1. To a portion of this dispersion was added 1.0% (based on the weight of the copolymer in the dispersion) of polyvinyl chloride particles ranging in size from 0.17 to 0.22 micron. Regenerated cellulose film approximately .001" thick was then coated with the dispersion containing 1.0% added particles, dried and evaluated. Coated film with good slip and good matting resistance resulted as shown in Table I.

EXAMPLE 3

An aqueous dispersion of a copolymer of vinylidene chloride, methyl acrylate and itaconic acid was prepared according to the formula in Example 1. To a portion of this dispersion was added 0.5% (based on the weight of the copolymer in the dispersion) of polyvinyl chloride particles ranging in size from 0.2 to 1.0 micron. Regenerated cellulose film approximately .001" thick was then coated with the dispersion containing 0.5% added particles, dried and evaluated. Coated film with good slip and matting resistance resulted as shown in Table I.

EXAMPLE 4

An aqueous dispersion of a copolymer of vinylidene chloride, methyl acrylate and itaconic acid was prepared according to the formula in Example 1. To a portion of this dispersion was added 0.5% (based on the weight of the copolymer in the dispersion) of polyvinyl chloride particles ranging in size from 0.17 to 0.22 micron. Regenerated cellulose film approximately .001" thick was then coated with the dispersion containing 0.5% added particles, dried, and evaluated. Coated film with good slip and good matting resistance resulted as shown in Table I.

EXAMPLE 5

An aqueous dispersion of a copolymer of vinylidene chloride, methyl acrylate and itaconic acid was prepared according to the formula in Example 1. To a portion of this dispersion was added 0.25% (based on the weight of the copolymer in the dispersion) of polyvinyl chloride particles ranging in size from 0.2 to 1.0 micron. Regenerated celulose film approximately .001" thick was then coated with the dispersion containing 0.25% added particles, dried, and evaluated. Coated film with good slip and good matting resistance resulted as shown in Table I.

EXAMPLE 6

An aqueous dispersion of a copolymer of vinylidene chloride, methyl acrylate and itaconic acid was prepared according to the formula in Example 1. To a portion of this dispersion was added 0.25% (based on the weight of the copolymer in the dispersion) of polyvinyl chloride particles ranging in size from 0.17 to 0.22 micron. Regenerated cellulose film approximately .001" thick was then coated with the dispersion containing 0.25% added particles, dried and evaluated. Coated film with good slip and good matting resistance resulted as shown in Table I.

EXAMPLE 7

An aqueous dispersion of a copolymer of vinylidene chloride, methyl acrylate and itaconic acid was prepared as described in Example 1. To this dispersion was added 1.0% (based on the weight of the copolymer in the dispersion) of polyvinyl chloride particles ranging in size from 0.17 to 0.22 micron. Oriented polyethylene terephthalate film .001" thick was then coated with the resulting dispersion containing polyvinyl chloride particles, dried and evaluated as previously described. As shown in Table I, the coated film exhibited good slip and matting characteristics without any substantial sacrifice in clarity.

EXAMPLE 8

To an aqueous dispersion of a copolymer of vinylidene chloride, methyl acrylate and itaconic acid, prepared as described in Example 1, was added 0.5% (based on the weight of the copolymer in the dispersion) of polyvinyl chloride particles ranging in size from 0.17 to 0.22 micron. The resulting dispersion was then coated on oriented polyethylene terephthalate film 0.001" thick, the coating dried, and thereafter evaluated with the results shown in Table I.

TABLE I

| Example | Percent particles | Particle size range (micron) | Total coating thickness (gm./sq. meter of film) | Slip | Hand slip | Matting | I.P.V. | Haze meter | 35% R.H.[1] heat seal (gm.s.) |
|---|---|---|---|---|---|---|---|---|---|
| Control [2] | | | 5.8 | 1.11 | 2 | 3 | 85 | 37 | 248 |
| 1 | 1.0 | 0.2 –1.0 | 5.8 | 3.07 | 1 | 1 | 56 | 54 | 287 |
| 2 | 1.0 | 0.17–0.22 | 5.6 | 3.27 | 1 | 1 | 70 | 43 | 260 |
| 3 | 0.5 | 0.2 –1.0 | 4.9 | 3.27 | 1 | 1 | 69 | 44 | 290 |
| 4 | 0.5 | 0.17–0.22 | 4.9 | 3.49 | 1 | 1 | 55 | 49 | 286 |
| 5 | 0.25 | 0.2 –1.0 | 4.9 | 3.27 | 1 | 1 | 69 | 36 | 260 |
| 6 | 0.25 | 0.17–0.22 | 4.8 | 3.27 | 1 | 1 | 63 | 41 | 281 |
| Control [3] | | | 6.1 | 1.11 | 3 | 3 | 39 | 35 | 237 |
| 7 | 1.0 | 0.17–0.22 | 6.2 | 3.49 | 1 | 1 | 37 | 45 | 240 |
| 8 | 0.5 | 0.17–0.22 | 6.0 | 3.07 | 1 | 1 | 35 | 42 | 232 |

[1] Heat seals were conditioned at 35% R.H. for 24 hours before being pulled.
[2] Base film of regenerated cellulose about 0.001″ thick.
[3] Oriented base film of polyethylene terephthalate 0.001″ thick.

I claim:
1. A process for improving the surface characteristics of a transparent non-fibrous organic base sheet coated with a protective transparent coating of vinylidene chloride copolymer which comprises adding a sufficient amount of solid particles of polyvinyl chloride, ranging in size from 0.10 to 1.5 microns, to an aqueous dispersion of solid particles, ranging in size from 0.05 to 0.5 of a micron, of a copolymer of vinylidene chloride and at least one ethylenically unsaturated monomer polymerizable with vinylidene chloride, said copolymer containing not less than 75% vinylidene chloride, to form an aqueous dispersion containing from 0.1% to 5% by weight of polyvinyl chloride particles based on the total weight of polymer particles in the dispersion, and thereafter coating said dispersion on a non-fibrous organic base sheet, and drying the coated base sheet.

2. The process of claim 1 wherein the base sheet is regenerated cellulose film.

3. The process of claim 1 wherein the base sheet is polyethylene terephthalate film.

4. The process of claim 1 wherein the copolymer is a copolymer of vinylidene chloride, methyl acrylate, and itaconic acid.

5. A coating composition suitable for coating transparent non-fibrous organic base sheets comprising essentially an aqueous dispersion of solid particles of (1) a copolymer of vinylidene chloride and at least one ethylenically unsaturated monomer polymerizable with vinylidene chloride, said copolymer containing not less than 75% vinylidene chloride, said copolymer particles having a size with the range of from 0.05 to 0.5 of a micron, and (2) polyvinyl chloride having a size within the range of from 0.10 to 1.5 microns, the amount of said polyvinyl chloride particles in said dispersion being within the range of from 0.1% to 5% by weight, based upon the total weight of polymer particles in said dispersion.

6. The product of claim 5 wherein the copolymer is a copolymer of vinylidene chloride, methyl acrylate, and itaconic acid.

7. A transparent non-fibrous organic base sheet having a continuous coalesced adherent transparent coating of a copolymer of vinylidene chloride and at least one ethylenically unsaturated monomer polymerizable with vinylidene chloride, said copolymer containing at least 75% vinylidene chloride, said coating having distributed therethrough from 0.1% to 5% by weight, based on the total weight of the coating, of particles of polyvinyl chloride.

8. Regenerated cellulose film having a continuous coalesced adherent transparent coating of a copolymer of vinylidene chloride and at least one ethylenically unsaturated monomer polymerizable with vinylidene chloride, said copolymer containing at least 75% vinylidene chloride, said coating having distributed therethrough from 0.1% to 5% by weight, based on the total weight of the coating, of particles of polyvinyl chloride.

9. Regenerated cellulose film having a continuous coalesced adherent transparent coating of a copolymer of vinylidene chloride, methyl acrylate, and itaconic acid, said copolymer containing at least 75% vinylidene chloride, said coating having distributed therethrough from 0.1% to 5% by weight, based on the total weight of the coating, of particles of polyvinyl chloride.

10. Polyethylene terephthalate film having a continuous coalesced adherent transparent coating of a copolymer of vinylidene chloride and at least one ethylenically unsaturated monomer polymerizable with vinylidene chloride, asid copolymer containing at least 75% vinylidene chloride, said coating having distributed therethrough from 0.1% to 5% by weight, based on the total weight of the coating, of particles of polyvinyl chloride.

11. Polyethylene terephthalate film having a continuous coalesced adherent transparent coating of a copolymer of vinylidene chloride, methyl acrylate, and itaconic acid, said copolymer containing at least 75% vinylidene chloride, said coating having distributed therethrough from 0.1% to 5% by weight, based on the total weight of the coating, of particles of polyvinyl chloride.

References Cited in the file of this patent

UNITED STATES PATENTS

| | | |
|---|---|---|
| 2,459,125 | Cheyney | Jan. 11, 1949 |
| 2,541,167 | Pitzl | Feb. 13, 1951 |
| 2,709,689 | Herzog et al. | May 31, 1955 |
| 2,748,027 | Meier | May 29, 1956 |